United States Patent [19]

Robison et al.

[11] Patent Number: 5,221,787
[45] Date of Patent: Jun. 22, 1993

[54] METHOD OF PREPARING MALEIC ANHYDRIDE TERPOLYMERS

[75] Inventors: John C. Robison, Simpsonville, S.C.; James M. Haynes, Parkersburg; John E. Pace, Washington, both of W. Va.

[73] Assignee: General Electric Company

[21] Appl. No.: 453,319

[22] Filed: Dec. 22, 1989

[51] Int. Cl.$^5$ .......................................... C08F 222/04
[52] U.S. Cl. .................................................. 526/272
[58] Field of Search ........................................ 526/272

[56] References Cited

U.S. PATENT DOCUMENTS 4,328,327  5/1982  Tanaka et al. ...................... 526/272

OTHER PUBLICATIONS

European Search Report dated Jul. 23, 1991.

Primary Examiner—Joseph L. Schofer
Assistant Examiner—Alex H. Walker
Attorney, Agent, or Firm—Lowe, Price, LeBlanc & Becker

[57] ABSTRACT

A terpolymer of a monovinylic aromatic monomer, an acrylic monomer and maleic anhydride is formed according to a polymerization method in which the maleic anhydride is added to the reactor in a molten state, free of solvents and diluents, and the polymerization reaction is conducted in bulk in the absence of solvents and diluents. The terpolymer is useful in various applications including blending with ABS graft polymers.

9 Claims, 1 Drawing Sheet

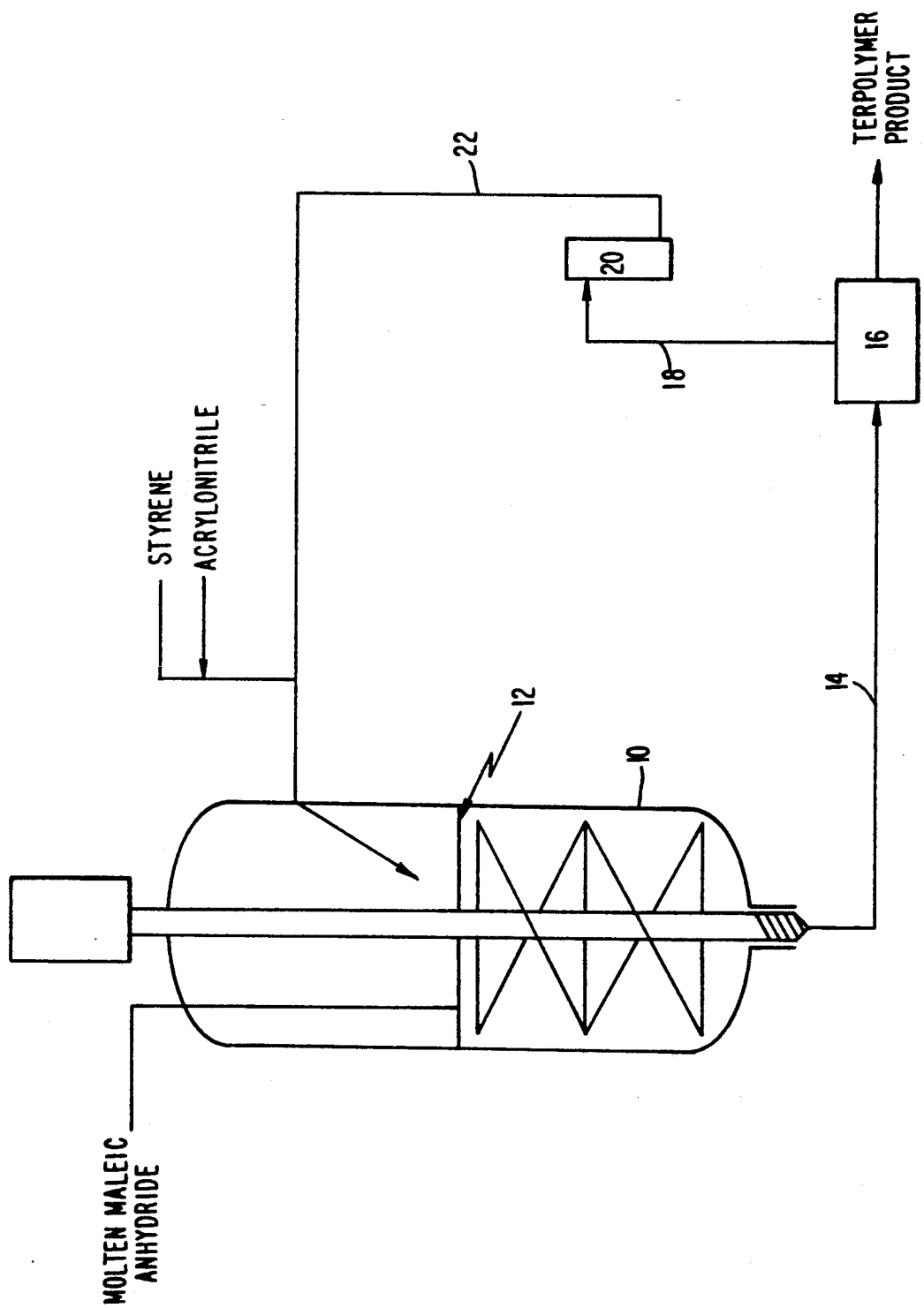

METHOD OF PREPARING MALEIC ANHYDRIDE TERPOLYMERS

FIELD OF THE INVENTION

The present invention relates to methods of preparing maleic anhydride terpolymers and, more specifically, to methods for preparing monovinylic aromatic-acrylic-maleic anhydride terpolymers wherein the polymerization reaction is conducted in bulk in the absence of solvents and diluents.

BACKGROUND OF THE INVENTION

Various terpolymers of a monovinylic aromatic compound, an acrylic compound and maleic anhydride are known in the art and have been prepared according to various processes. For example, the Wingler et al U.S. Pat. No. 4,141,934 discloses polymers of styrene and/or α-methylstyrene, a monoolefinically unsaturated monomer containing nitrile groups such as acrylonitrile and at least one additional monoolefinicially unsaturated monomer such as maleic anhydride which are formed using bulk polymerization methods. The bulk polymerization methods employ one or more initiators and pressures of from 1 to 20 bars. The Dufour U.S. Pat. No. 4,298,716 discloses a tetrapolymer of α-methylstyrene, styrene, maleic anhydride and acrylonitrile which is prepared by mass/suspension batch processes wherein the α-methylstyrene acts as a chain transfer agent.

The Lee et al U.S. Pat. Nos. 4,223,096 and 4,262,096 disclose styrene-acrylonitrile-maleic anhydride terpolymers which are formed by bulk polymerization methods in the presence of a rubber such as polybutadiene. The Lee et al processes employ a catalytic initiator and a chain transfer agent and are conducted in the presence of one or more solvents. The Zimmerman et al U.S. Pat. No. 3,336,267 discloses a process for the solution polymerization of styrene, maleic anhydride and a methacrylic or acrylic acid ester using from 5 to 50 weight percent of one or more solvents. The Liebig et al U.S. Pat. No. 4,167,543 discloses styrene-acrylonitrile-maleic anhydride terpolymers which are formed using a polymerization initiator and which are suitable for use in thermoplastic molding compositions with an ABS type copolymer.

Various processes for preparing styrene-acrylonitrile-maleic anhydride terpolymers which are known in the art are disadvantageous in one or more respects including, for example, they are relatively expensive, they require increased process control and/or they result in inferior terpolymer products.

SUMMARY OF THE INVENTION

Accordingly, it is an object of the present invention to provide a new process for the polymerization of a terpolymer from a monovinylic aromatic monomer, an acrylic monomer, and maleic anhydride. It is an additional object of the present invention to provide such a method which is both economical and efficient in providing a homogeneous terpolymer product. It is a further object of the invention to provide a method for producing such a terpolymer having improved properties and which are superior for use in forming blends with ABS graft polymers.

These and additional objects are provided by the methods according to the present invention. The present methods relate to the polymerization of a terpolymer from a monovinylic aromatic monomer, an acrylic monomer and maleic anhydride in a reactor, wherein the maleic anhydride is added to the reactor in a molten state, with the molten maleic anhydride being free of solvents and diluents, and wherein the polymerization reaction is conducted in bulk in the absence of solvents and diluents. The present methods allow superior reaction control and are both economic and efficient in monomer conversion. Additionally, the resulting terpolymers are useful in various applications including blending with ABS graft copolymers.

These and additional objects and advantages will be more apparent in view of the following detailed description.

BRIEF DESCRIPTION OF THE DRAWING

The following detailed description will be more fully understood in view of the accompanying drawing which comprises a sole figure setting forth a schematic diagram of a reaction system for use in the present methods.

DETAILED DESCRIPTION

The present invention relates to a method for the polymerization of a terpolymer from a monovinylic aromatic monomer, an acrylic monomer and maleic anhydride. As will be set forth below, important features of the present method include adding the maleic anhydride to the reactor in a molten state, with the molten maleic anhydride being free of solvents and diluents, and conducting the polymerization reaction in bulk in the absence of solvents and diluents.

The monovinylaromatic monomers which may be utilized in preparing the terpolymer are generically described by the following formula:

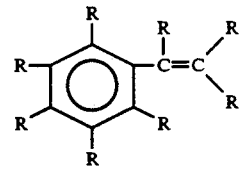

wherein R is selected from the group consisting of hydrogen, halogens, alkyl, cycloalkyl, aryl, alkaryl, aralkyl, alkoxy and aryloxy. Specific vinylaromatic compounds include styrene para-methylstyrene, α-methylstyrene, 3,5-diethylstyrene, 4-n-propylstyrene, α-methyl vinyltoluene, α-chlorostyrene, α-bromostyrene, dichlorostyrene, dibromostyrene, tetrachlorostyrene, mixtures thereof, and the like. The preferred monovinylaromatic monomer used is styrene.

Acrylic monomers suitable for use in the terpolymer are described generically by the following formula:

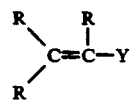

wherein R is as previously defined and Y is selected from the group consisting of cyano and carbalkoxy groups wherein the alkoxy group of the carbalkoxy contains from one to about twelve carbon atoms. Examples of such monomers include acrylonitrile, ethacrylonitrile, methacrylonitrile, α-chloroacrylonitrile, β-chloroacrylonitrile, α-bromoacrylonitrile, β-bromoacrylonitrile, methyl acrylate, ethyl acrylate, butyl acrylate, propylacrylate, isopropyl acrylate, alkyl methacrylates, and mixtures thereof. The preferred acrylic monomer is acrylonitrile.

The method according to the present invention produces homogeneous terpolymers of the monovinylic aromatic monomer, the acrylic monomer and maleic anhydride by continuously feeding the monomers to a polymerization reactor and continuously removing a polymer/monomer solution from the reactor. While in the past it has been customary to add maleic anhydride in solution with solvents, it is an important feature of the present method that the maleic anhydride is added to the reactor in a molten state which is free of solvents and diluents. The molten maleic anhydride may be premixed with the other monomers prior to addition to the reactor.

It is also an important feature of the present method that the polymerization reaction is conducted in bulk in the absence of solvents and diluents. While in the past it has been customary to polymerize styrene-acrylonitrile-maleic anhydride polymers in reactors maintained at pressures of from 1 to 20 bars, the present methods may be conducted at reactor pressures of from about 0.5 to about 1.5 bars (absolute), and preferably at reactor pressures of from about 0.5 to about 0.9 bar (absolute), in order to obtain better reactor control of the polymerization reaction. In a further preferred embodiment of the present method, the polymerization reaction is initiated thermally in the absence of chemical initiators such as the peroxide initiators which are commonly employed in such polymerization reactions. Suitably, the reactor may be operated at a temperature of from about 220° to about 260° F., whereby a monomer conversion of 30 to 75 mole percent may be achieved.

As noted above, polymer/monomer solution may be removed from the reactor and then directed to a devolatization system wherein the unreacted monomer is separated from the polymer. Various devolatization apparatus which are known in the art may be employed to remove the unreacted monomers from the polymer. For example, common devices such as flash chambers or vented extruders may be employed. The majority of the heat of polymerization may be removed from the reactor via refluxing of the unreacted monomers. The unreacted monomers are then recycled to the reactor for further reaction. Reaction rates of 15 to 30 percent per hour have typically been achieved. As noted above, the reaction takes place totally in bulk with no solvents or diluents present.

The Figure discloses a schematic diagram of a reaction system suitable for use in the present method. With reference to the Figure, a single stir tank reactor 10 operating at a pressure of about 0.5 to about 1.5 bars (absolute), preferably from about 0.5 to about 0.9 bar (absolute), and at a temperature of about 220° to about 260° F. may be employed. Molten maleic anhydride is supplied to the reactor, free of any solvents or diluents. Styrene and acrylonitrile may be added to the reactor separately or together in a usual manner. A polymer/monomer solution is continuously removed from the reactor via outlet line 14 and is directed to a devolatization system 16 where unreacted monomer is separated from the polymer product. Unreacted monomer is directed via line 18 to a refluxing apparatus 20 for heat removal and is then recycled via line 22 back to the reactor for further reaction. As shown in the Figure, the recycled monomer may be combined with the styrene and acrylonitrile feed lines prior to introduction into the reactor.

Although the present methods may be employed to produce terpolymers containing varying amounts of the monovinylic aromatic monomer, the acrylic monomer and maleic anhydride, it is preferred that the monomer feeds are controlled to provide terpolymers comprising from about 60 to about 95 weight percent of the monovinylic aromatic monomer, preferably styrene, from about 5 to about 35 weight percent of the acrylic monomer, preferably acrylonitrile, and up to about 30 weight percent maleic anhydride. The resulting rigid terpolymer is particularly suitable for use in blends with ABS type graft copolymers to produce improved ABS blend compositions. Since the rigid terpolymer is formed in the absence of a rubber substrate, the reactor may be operated under less viscous conditions than those in which a bulk ABS type product is produced. This allows for higher reactor operating conversions and easier operation while producing a rigid terpolymer which is advantageous for blending with ABS type graft copolymers.

The preferred embodiments set forth above are to illustrate the invention and are not intended to limit the methods and products of the present invention. Additional embodiments and advantages within the scope of the claimed invention will be apparent to one of ordinary skill in the art.

What is claimed is:

1. A method for polymerizing a terpolymer, comprising adding monomers consisting essentially of a monovinylic aromatic monomer, acrylonitrile and maleic anhydride to a reactor, the maleic anhydride being added to the reactor in a molten state, with the molten maleic anhydride being free of solvents and diluents, and the feed of the monomers to the reactor being controlled to provide a terpolymer consisting essentially of from about 60 to about 95 weight percent of the monovinylic aromatic monomer, from about 5 to about 35 weight percent acrylonitrile and up to about 30 weight percent maleic anhydride; and conducting the polymerization reaction in bulk in the absence of solvents and diluents, the polymerization reaction being initiated thermally in the absence of a chemical initiator.

2. A method as defined by claim 1, wherein the reactor is operated at a pressure of from about 0.5 to about 1.5 bars (absolute).

3. A method as defined by claim 2, wherein the reactor is operated at a pressure of from about 0.5 to about 0.9 bar (absolute).

4. A method as defined by claim 1, wherein the reactor is operated at a temperature of from about 220° to about 260° F.

5. A method as defined by claim 1, wherein polymer and unreacted monomer are removed from the reactor and directed to a devolatization system where the unreacted monomer is separated from the polymer.

6. A method as defined by claim 5, wherein the separated monomer is recycled to the reactor.

7. A method as defined by claim 1, wherein the molten maleic anhydride is added separately to the reactor.

8. A method as defined by claim 1, wherein the molten maleic anhydride is premixed with at least one additional monomer prior to addition to the reactor.

9. A method as defined by claim 1, wherein the monovinylic aromatic monomer comprises styrene.

* * * * *